United States Patent [19]

Ly et al.

[11] Patent Number: 4,970,034

[45] Date of Patent: Nov. 13, 1990

[54] PROCESS FOR PREPARING ISOTROPIC MICROPOROUS POLYSULFONE MEMBRANES

[75] Inventors: Ann L. Ly, Bedford; Chaokang Chu, Lexington; Thanh D. Nguyen, Billerica, all of Mass.

[73] Assignee: W. R. Grace & Co.-Conn., New York, N.Y.

[21] Appl. No.: 248,880

[22] Filed: Sep. 23, 1988

[51] Int. Cl.$^5$ .............................................. B29C 67/20
[52] U.S. Cl. ...................................... 264/46.4; 264/41;
264/49; 264/557; 264/561; 264/562; 264/184;
264/209.1; 264/211.16; 264/216; 210/500.41
[58] Field of Search ....................... 210/500.28, 500.33,
210/500.38, 500.41; 264/41, 49, 46.4, 557, 561,
562, 184, 209.1, 211.16, 216

[56] References Cited

U.S. PATENT DOCUMENTS

| | | | |
|---|---|---|---|
| 3,691,068 | 9/1972 | Cross | 210/22 |
| 3,855,122 | 12/1974 | Bourganel | 264/49 X |
| 4,029,582 | 6/1977 | Ishii et al. | 210/500 M |
| 4,207,182 | 6/1980 | Marze | 210/23 F |
| 4,342,711 | 8/1982 | Joh et al. | 264/41 |
| 4,481,260 | 11/1984 | Nohmi | 264/41 X |
| 4,612,251 | 9/1986 | Eguchi | 210/500.23 |
| 4,690,765 | 9/1987 | Linder et al. | 210/500.28 X |
| 4,690,766 | 9/1987 | Linder et al. | 210/500.28 X |
| 4,720,343 | 1/1988 | Walch et al. | 210/500.28 |
| 4,744,932 | 5/1988 | Browne | 264/41 |
| 4,772,391 | 9/1988 | Baker et al. | 264/41 |
| 4,820,460 | 4/1989 | Repetti et al. | 264/41 |

FOREIGN PATENT DOCUMENTS

| | | |
|---|---|---|
| 100285 | 9/1986 | European Pat. Off. |
| 172312 | 9/1985 | Japan . |
| 1000410 | 1/1986 | Japan . |
| 1028419 | 2/1986 | Japan . |
| 1057628 | 3/1986 | Japan . |
| 1113460 | 5/1986 | Japan . |
| 61-238834 | 10/1986 | Japan . |
| 2174641 | 11/1986 | United Kingdom . |

OTHER PUBLICATIONS

Cabasso et al., *Journal of Applied Polymer Science*, (vol. 20, pp. 2377–2394, (1976))—"Polysulfone Hollow Fibers. I. Spinning and Properties".

Cabasso et al., *Journal of Applied Polymer Science*, (vol. 21, pp. 165–180, (1977))—"Polysulfone Hollow Fibers. II. Morphology".

Cabasso et al., *Journal of Applied Polymer Science*, (vol. 21, pp. 1883–1900 (1977))—"Porosity and Pore Size Determination in Polysulfone Hollow Fibers".

Aptel et al., *Journal of Membrane Science*, (vol. 22, pp. 199–215, (1985))—"Polysulfone Hollow Fibers—Effect of Spinning Conditions on Ultrafiltration Properties".

*Primary Examiner*—Hubert C. Lorin
*Attorney, Agent, or Firm*—Jill H. Krafte

[57] ABSTRACT

Isotropic microporous polysulfone membranes can be prepared by using a particular combination of casting solution and precipitation solution formulations, and casting conditions. Both hollow fiber and flat membranes can be prepared in this manner. The membranes are skinless and are characterized by uniform porosity throughout the membrane.

20 Claims, 2 Drawing Sheets

PROCESS FOR PREPARING ISOTROPIC MICROPOROUS POLYSULFONE MEMBRANES

BACKGROUND OF THE INVENTION

This invention relates to the preparation of microporous polysulfone membranes. More specifically, the membranes prepared according to this invention are isotropic, or homogeneous, in that the porosity of the membrane is uniform over the cross section of the membrane. In addition, there is no skin present on either the inner or outer surface of the membranes of this invention. These characteristics are achieved by using a novel combination of casting solution, precipitation solution and spinning conditions. Liquid-liquid membrane precipitation or coagulation is employed. Both hollow fiber and flat sheet membranes can be prepared according to this invention.

Polysulfone membranes and hollow fiber membranes are known to the art and have been prepared to a variety of specifications. However, prior art hollow fibers typically are asymmetrical, or anisotropic. This type of fiber comprises a "skin" at the inner and/or outer surface and a microporous understructure. For example, U.S. Pat. No. 3,691,068 (Cross) discloses an anisotropic microporous polysulfone polymer membrane having a barrier layer at a surface thereof and a more porous support layer integral with the barrier layer. Similarly, U.S. Pat. No. 4,029,582 (Ishii et al.) discloses poly(arylether-sulfone) semipermeable membranes having a thin dense layer and a porous supporting layer.

Skinless polysulfone hollow fibers are known to the art. U.S. Pat. No. 4,612,119 (Eguchi) discloses preparation of a polysulfone hollow fiber filter medium having substantially no skin layer in the outer and inner surface areas. Eguchi uses a dry-wet spinning process, with carefully controlled temperatures. Cabasso et al., "Polysulfone Hollow Fibers II. Morphology," J. Applied Polymer Science, Vol. 21, pp. 165-80 (1977), which also utilizes a dry-wet spinning method, reports that control of the extrusion/coagulation procedure allows the formulation of skinned, porous skinned and non-skinned fibers. In a dry-wet spinning process, the membrane casting solution is extruded into an air space and then is conducted into a liquid precipitation medium.

SUMMARY OF THE INVENTION

The process of this invention allows for the preparation of isotropic polysulfone microporous membranes. The membranes are skinless and are homogeneous from surface to surface.

It is a primary object of this invention to provide isotropic polysulfone microporous membranes. In relation to this, it is desired that the membranes have good tensile strength and a uniform, dense, spongy wall structure.

It is intended that this process offer the ability to control the porosity and membrane wall thickness. At the same time, however, it is expected that membranes prepared in this manner will have more flexibility with respect to application and quality control than would be true of the prior art anisotropic membranes, by virtue of the uniformity of the membrane wall structure. For these membranes, the entire wall, rather than just the skin portion, performs the filtration. For that reason, it is expected that minor imperfections in isolated portions of the wall will not affect or impair the ability of the membrane to function.

It is another object to teach appropriate spinning and setting conditions to allow for the formation of skinless hollow fiber membranes.

Still another object is to provide membranes which are useful in industrial or pharmaceutical protein fractionation. As one specific purpose, it is intended to provide membranes which exhibit high rejection of high molecular weight materials, while allowing lower molecular weight materials to flow through. As another specific purpose, it is intended to provide membranes with a high surface area of polymer in the membrane wall in order to afford a high concentration of immobilization sites for cells or other bioactive agents.

DETAILED DESCRIPTION OF THE INVENTION

Figure 1:
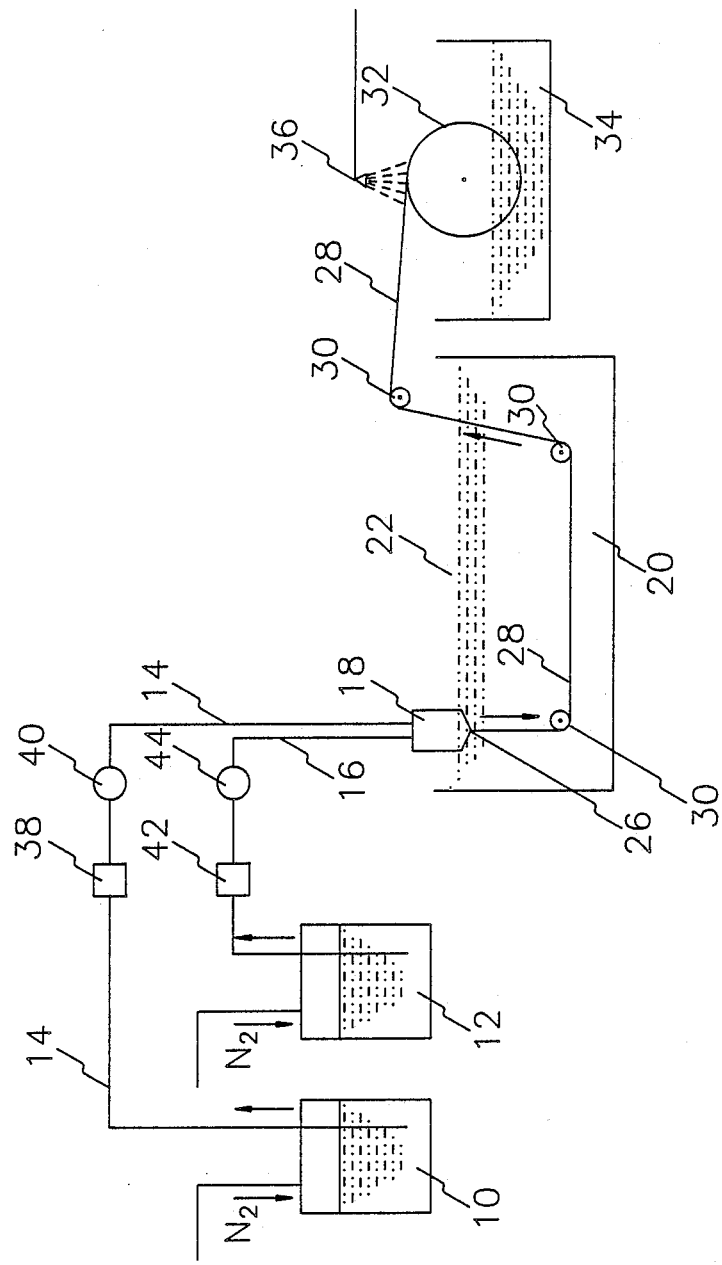
FIG. 1 is a schematic diagram of the hollow fiber membrane spinning process used in Example I.

A method of membrane preparation has been discovered by which isotropic polysulfone membranes may be prepared in either hollow fiber or flat sheet form. The porous membranes of this invention are manufactured by a phase inversion process in a liquid-liquid precipitation scheme. This process involves the conversion of a liquid homogeneous polymer solution (casting solution) comprising two or more components into a solid, but flexible, porous film or fiber. The casting solution contains one or more polymers, one or more solvents for the polymer(s) and one or more non-solvents for the polymer(s). The non-solvent acts as a pore-former and hereafter the non-solvent used in the casting solution will be referred to as a pore-former or pore-forming agent or compound.

The casting solution is extruded directly into a liquid precipitation medium, where formation of the membrane occurs by phase inversion, that is, by precipitation of the polymeric component from the casting solution. This is referred to as liquid-liquid phase separation. In the case of hollow fiber formation, it may also be known as wet spinning. During the initial contact with the precipitation solution, solvent is drawn from the casting solution, increasing the concentration of pore-former and polymer until the increased polymer concentration causes precipitation of the polymer from the casting solution. The membrane continues to form as both solvent and pore-former are leached out and the polymer precipitates completely.

The factors influencing membrane porosity, pore size and overall morphology are exceedingly complex. It has been discovered that a particular combination of these factors, i.e., casting solution, precipitation solution and spinning conditions, will yield an isotropic polysulfone microporous hollow fiber membrane. By "isotropic" is meant that the porosity of the membrane is uniform from one side to the other. The membrane is skinless. Analogous methods are used for the formation of an isotropic polysulfone microporous flat sheet membrane. The membranes of this invention can be prepared using polysulfone as the sole polymeric component, or using a combination of polysulfone with other polymers.

Polymeric Components

The membranes of this invention are polysulfone-based polymeric compositions. Polysulfone (PS) polymers are available in a variety of grades with respect to molecular weight, additives, etc. High molecular weight polysulfones may be preferred for preparation of membranes with additional strength. Udel TM 3500 and Udel TM 1700 polysulfone polymers (Amoco Performance Products Inc.) are suitable. Polysulfone is used as the primary polymeric component of the membrane because of such beneficial characteristics as thermal stability, resistance to acid, alkali and salt solutions, high mechanical strength, etc.

Other polymers or prepolymers can be used in combination with the polysulfone polymer, if desired, to impart various characteristics to the membrane product. Polyethylene glycol (PEG), polyvinyl pyrrolidone (PVP) or any of a variety of polyurethane prepolymers may be used with the polysulfone to prepare these membranes. For example, the isocyanate-capped polyurethane prepolymers disclosed in U.S. Pat. No. 4,137,200 (Wood et al.) are particularly suitable. The HYPOL TM polyurethane prepolymers series produced by Grace Specialty Chemicals Co., W. R. Grace & Co.-Conn., offer commercially available examples of the '200 prepolymers. The BIOPOL TM isocyanate-capped polyurethane prepolymer series available from Grace Specialty Chemicals Co., W. R. Grace & Co.-Conn., is also particularly suitable. The prepolymers of the latter series have high proportions, at least about 75%, of oxyethylene-based diols or polyols having molecular weights of up to about 30,000 or higher. This prepolymer series is further described in U.S. Ser. No. 130,826 (Braatz et al.), "Biocompatible Polyurea-Urethane Hydrated Polymers", filed on Dec. 9, 1987.

Polymers or prepolymers such as these are added to the polysulfone polymer in order to modify the structure and surface characteristics of the polysulfone membrane. The additional polymer or prepolymer becomes an integral part of the membrane structure. Polysulfone alone is very hydrophobic. Addition of a polymer or prepolymer such as those described above renders the membranes more hydrophilic than they would otherwise be. Moreover, addition of the BIOPOL TM polyurethane prepolymers results in membranes with increased resistance to nonspecific protein adsorption as well as enhanced biocompatibility. Whereas the polysulfone polymer precipitates out of the casting solution, a polyurethane prepolymer actually polymerizes upon contact with the aqueous precipitation solution.

Casting Solution

As described above, the casting solution is a multi-component solution comprising polymeric, solvent and non-solvent (pore-forming) components. The primary polymeric component will be the polysulfone polymer. The polymeric component would, of course, also comprise any other polymer or prepolymer which is used together with the PS polymer to form the membranes. Where reference is made to the polysulfone solution or casting solution, it is intended to include all polymeric components. That is, it will include the polysulfone polymer and, where appropriate, it also will include a selected additional polymer or prepolymer as described above.

The solvent component of the casting solution must be one in which polysulfone (as well as any other polymer or prepolymer used) is soluble. The polysulfone polymer is soluble in various solvents, such as N-methylpyrrolidone (N-MP), dimethylformamide (DMF), N,N-dimethylacetamide (DMA), cyclohexanone, chloroform, and 4-butyrolactone. N-MP is the preferred solvent.

At least about 8.0 wt % and up to about 35.0 wt % polysulfone in solvent should be used, preferably about 9.0 to about 18.0 wt %. Above 35 wt %, it will be difficult or impossible to dissolve the polysulfone in the solvent. Below about 8%, precipitation will be too slow for formation of hollow fibers. However, flat sheet membranes may be prepared with PS concentrations lower than 8.0 wt %. Up to about 20.0 wt % of a second polymeric component, that is, one or more of the polymers or prepolymers described above, can be added to the PS solution.

Selection of the pore-forming component is very important for the ultimate characteristics of the membrane. Pore formation will vary depending on the interaction between the non-solvent (pore-former) and the other components of the casting solution, as well as the solubility of the pore-former in the precipitation solution, etc. The selection of the pore-forming agent will affect casting solution viscosity and rate of casting solution precipitation, as well as membrane porosity, permeability and morphology. The pore-forming component must be soluble in the precipitation solution used in the membrane formation process.

The polymer or prepolymer component which may be added in conjunction with the polysulfone could be considered a non-solvent in that it will not dissolve PS. However, although this component may partially leach out of the membrane, it does not completely leach out as do the precipitation-medium-soluble non-solvents (pore-formers) listed below.

Generally, the pore-forming component can be selected from alkanols, polyols, polyglycols, cyclokotones, polyvinyl pyrrolidone, water or combinations thereof. Specific, but non-limiting, examples include methanol, t-butanol, acetone, cyclododecanone, 4-hydroxybutyric acid and polyethylene glycol. The quantity used will vary and can be determined for each pore-forming composition by routine optimization. For low molecular weight pore-formers, it will be preferred to use larger quantities in the casting solution. Where high molecular weight pore-formers are used, such as high molecular weight PVP or PEG, they may not completely leach out of the membrane during normal processing.

Precipitation Solution

The precipitation or coagulation mechanism of membrane formation is affected by the composition of the precipitation solution as well as that of the casting solution, and the composition of these two solutions are interdependent. In this disclosure, the terms "precipitation solution," "coagulation solution," "quench solution" and "quench bath" are used interchangeably to refer to the solution in which the membrane is formed. For formation of hollow fiber membranes, both an outer and a center precipitation or quench solution will be employed. The precipitation solution is made up of three essential components: solvent, non-solvent and swelling agent. Together, these components control the rate of membrane precipitation as well as the membrane characteristics, resulting in formation of the isotropic membrane of this invention.

The solvent content of the precipitation solution controls the rate at which the solvent comes out of the casting solution. In turn, this controls the rate of increase of the polymer concentration to the point at which the polymeric component precipitates out of the casting solution to form the membrane. The same solvent usually is used in the casting solution and the precipitation solution. N-MP is the preferred solvent. Other solvents are discussed above with regard to casting solutions.

A non-solvent is used in the precipitation solution in order to precipitate the polymer from the casting solution, thus causing formation of the membrane. For practical and economical purposes, it is preferred to use water as the non-solvent component of the precipitation solution. However, other non-solvents such as methanol, ethanol, propanol, butanol, ethylene glycol, acetone, methyl ethyl ketone, or the like, as listed above, can be used instead of water, particularly when the solvent is water-immiscible. Alternatively, water and one or more other non-solvents can be used together.

The presence of a swelling agent in the precipitation solution also serves to control the polymer precipitation rate. This component swells, but does not dissolve the polymer, thus slowing the rate of polymer precipitation. In addition, the presence of the swelling agent acts to favor the introduction of the precipitation medium into the casting solution, in exchange for the pore-former and solvent, resulting in the formation of a membrane with a high porosity. The preferred swelling agent is isopropyl alcohol (IPA). Alternatively, other components, or combinations thereof, can be used as the swelling agent. Triethylene glycol, nitrobenzene, tetrahydrofuran, dioxane, dimethyl carbonate, dimethyl sulfone, diethyl phosphate and dimethyl sulfoxide may be used as swelling agents.

In the preferred embodiment of this invention, the precipitation solution is made up of N-methylpyrrolidone (N-MP) as the solvent, isopropyl alcohol as the swelling agent and water as the non-solvent. About 10 to 70 wt % N-MP is used, preferably about 40 to 70 wt %, most preferably about 50 to 70 wt %. About 10 to 80 wt % IPA is used, preferably about 15 to 40 wt %. About 5 to 40 wt % water is used, preferably about 10 to 30 wt %. Where other solvents or swelling agents are substituted for these preferred components, these general ranges will still be applicable.

In utilizing the method of this invention to prepare hollow fiber membranes, the precipitation solution used for the outer quench bath preferably is different from that used for the center quench fluid, although the two can be the same. It probably will be preferred to utilize different solutions in order to more precisely control the phase inversion rate so that a symmetric (isotropic) membrane is produced. In hollow fiber production, the center quench and outer quench are different phenomena. At center quench, a small volume of solution is used, which is almost in a static mode as compared with the casting solution. Conversely, the outer quench bath is present in large volumes and in a dynamic mode. By controlling the solvent content of the two quench solutions, the phase inversion rate is controlled so as to produce an isotropic membrane. Solvent diffusion out of the casting solution will occur at a different rate at the inner and outer surfaces if the same precipitation solution is used. By adjusting the solvent and swelling agent content of the two solutions, the precipitation (or phase inversion) rate will be equilibrated, resulting in an isotropic membrane.

Hollow Fiber Spinning Conditions

In preparing hollow fiber membranes of this invention, a liquid-liquid or wet spinning process is used. That is, the casting solution is fed through an extrusion die (spinnerette) directly into a precipitation bath, while simultaneously introducing the center quench fluid through the central aperture of the spinnerette to mechanically maintain the hollow center hole of the fiber. The fiber is fabricated and simultaneously quenched as it is drawn through the precipitation bath. By using this wet-spinning process, fibers with homogeneous pore structure and membrane morphology are produced.

One of the key factors in preparation of the isotropic hollow fiber membranes of this invention is use of the wet spinning process, that is, spinning the casting solution directly into the precipitation solution or bath. In addition, selection of appropriate solutions for the inner and outer precipitation baths is important, as is the appropriate drawing or spinning rate of the fiber as it is formed. The presence of the center quench fluid also allows for simultaneous polymer precipitation from both the inner and outer surfaces of the fiber. The spinning rate is adjusted to allow for exchange of components between the casting and precipitation solutions. The solvent and pore-forming agent are leached out of the casting solution and are replaced by the non-solvent and swelling agent from the precipitation solution. As a consequence, polymer precipitation occurs, leading to formation of the membrane.

Too rapid a drawing rate will cause breakage due to insufficient membrane formation to maintain membrane integrity or will cause elongation or deformation of the pores. Conversely, too slow a drawing rate will cause defects resulting from excessive pressure by the center quench solution, which may cause blow-outs in the fiber structure. The preferred drawing rate will depend in part on the casting solution viscosity and temperature and in part on the factors described below. However, the drawing rate typically will be in the range of about 3.0 to about 30.0 feet per minute, preferably about 7.0 to about 20.0 feet per minute, and most preferably about 7.0 to about 15.0 feet per minute.

The precise spinning conditions are adjusted in order to yield hollow fibers meeting the desired physical requirements of inner diameter and wall thickness. Centering of the central aperture of the spinnerette is required in order to achieve a fiber having a uniform wall thickness. Any spinnerette suitable for the preparation of hollow fiber membranes may be used to prepare the membranes of this invention. The spinning conditions left to be adjusted are the flow rate and pressure of the casting solution, and the flow rate and pressure of the center quench fluid. These adjustments are well within the knowledge and ability of one of ordinary skill in this art. The preferred temperature for the casting solution will be in the range of ambient temperatures, although higher temperatures, e.g., up to about 70° C., may be employed to reduce the viscosity of the casting solution.

The dimensional and porosity characteristics of the membranes of this invention will depend on the desired end use as well as the various factors discussed above with respect to membrane preparation Generally speaking, membranes can be prepared which possess a pore diameter of between about 0.01 microns and several microns. The inner diameter of the hollow fibers can range from about 100 to several thousand microns. The wall thickness can range from about ten to several hundred microns.

Following the quench bath, the hollow fiber is washed in water to remove residual solvents, non-solvents and swelling agents. Standard hollow fiber water wash procedures are used. It may be desired to treat the hollow fiber membranes with a humectant, such as glycerin, or a surfactant to improve membrane wetability. For example, the fibers may be soaked overnight in a 10–30% (vol/vol) glycerin bath. This step is optional. The fibers are then dried and prepared for use. The fibers may, for example, be bundled and potted in a cartridge.

In the preferred embodiment of this invention, isotropic hollow fiber membranes are prepared according to the process diagrammed in FIG. 1. This process was used in preparing the membranes of Example I. Casting solution 12, which is maintained under nitrogen pressure, is drawn through conduit 16 by means of pump 44 to spinnerette 18, first passing through filter 42 to eliminate undissolved particles. Casting solution 12 is fed through a ring-shaped orifice in exit port 26 of spinnerette 18 to form the hollow fiber membrane.

Simultaneously, center quench solution 10, which also is maintained under nitrogen pressure, is drawn through conduit 14 by means of pump 40 to spinnerette 18, first passing through filter 38 to eliminate undissolved particles. Center quench solution 10 is fed through a second orifice at the center of the ring-shaped orifice in exit port 26 of spinnerette 18 to maintain the hollow center of the membrane.

For purposes of this invention, the fiber is spun directly into the precipitation medium. Spinnerette exit port 26 is located below surface 22 of outer quench bath 20 such that casting solution 12 and center quench 10 emerge from exit port 26 directly into outer quench bath 20. Precipitation begins immediately and hollow fiber membrane 28 is formed. Membrane 28 is drawn through outer quench bath 20 via rollers 30. Membrane 28 is then guided from outer quench bath 20 to pickup roll 32, which is partially submerged in wash bath 34. Water spray 36 is directed to the top of pickup roll 32 for further washing of membrane 28. Following the water bath, membrane 28 is dried and may be treated with a humectant or surfactant as described above. Membrane 28 is then dried and prepared for use.

The isotropic polysulfone-based hollow fiber membranes of this invention will find utility in industrial or pharmaceutical filtration and fractionation processes. These membranes exhibit good tensile strength, high water flux, and high hydraulic flux recovery. Membranes can be prepared which exhibit high rejection of high molecular weight species and low rejection of lower molecular weight species.

The membranes of this invention are excellently suited for plasmaphoresis, in contrast to prior art skinned membranes which do not allow sufficient plasma to flow through the membrane. The membranes are equally well suited for immobilizaton of enzymes or other reactive agents due to their high surface area and high flux, again as contrasted with skinned membranes. The fibers can thus be used in immobilization reactors, diagnostic kits, etc. The membranes of this invention may also be used for cell culture, either for fermentation reactions or in artificial organs, or the like.

Preparation of Flat Sheet Membranes

Either supported or non-supported isotropic flat sheet membranes can be made by the method of this invention. That is, the flat membranes can be prepared either with or without an integral supporting material. If an integral support is used, it preferably will be a nonwoven polyester or polypropylene material, although other supports may be used. Non-supported, or self-supported, flat sheet membranes can be fabricated by casting the casting solution directly onto a nonporous surface such as glass, stainless steel, or the like.

For either type, the casting solution is cast onto a rigid nonporous support, such as glass or stainless steel. Where supported membranes are prepared, the nonporous support is covered with a reinforcement material (e.g., nonwoven polyester) which will become an integral support. Since the membrane is supported during precipitation, precipitation can be at a slower rate than the hollow fiber membranes described above. This affords greater flexibility in preparing the casting and precipitation solutions. However, the guidelines given above will apply generally to flat sheet membrane formation as well.

Membrane casting may be with a casting knife, and membranes may be cast onto the support at the desired thickness (i.e., 2.0 to 15.0 mils, preferably 4.0 to 10.0 mils). The membrane is cast onto the support directly in the precipitation bath, without exposure to air. When membrane formation is complete, the membrane separates from the nonporous support. However, if reinforcement material is used, it becomes an integral part of the membrane.

The membrane is water washed to remove residual solvents, non-solvents and swelling agents. Standard water wash procedures are used. It may be desired to treat the membrane with glycerin or a surfactant to improve membrane wetability. For example, the membrane optionally may be soaked in a 10–30% (vol/vol) glycerin bath. The membrane is then dried and preapred for use.

Figure 2:
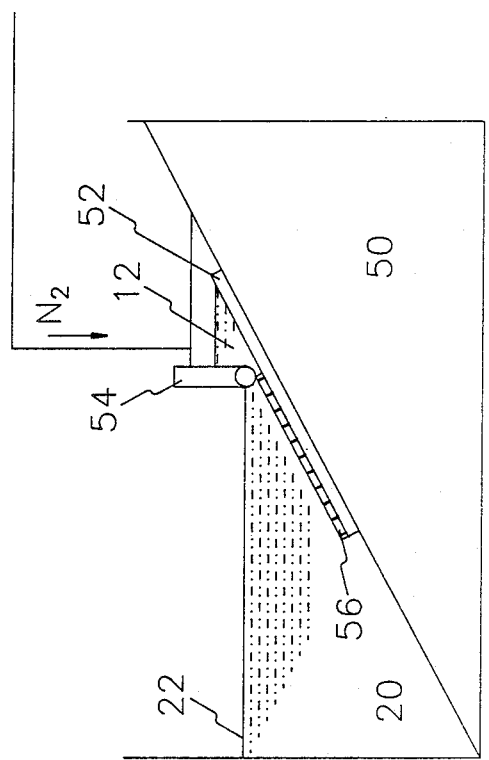
FIG. 2 is a schematic diagram of the flat sheet membrane casting process used in Examples II and III.

In the preferred embodiment for the manufacture of isotropic flat sheet membranes, the membranes are prepared according to the process diagrammed in FIG. 2. This process was used in preparing the membranes of Examples II and III. Casting solution 12 is held, under nitrogen pressure, behind casting knife 54 in such a manner that casting solution 12 may be cast directly onto support 52 in quench bath 20. That is, casting is such that cast membrane 56 is not exposed to air, but is cast directly into quench bath 20, below surface 22. Support 52 is drawn across supporting means 50 as membrane 56 is cast on it. Preferably, supporting means 50 is inclined to allow support 52 to slide into quench bath 20 as flat sheet membrane 56 is cast. Other configurations may be employed. The formed membrane may be removed and placed in a water wash or other treatment.

The utilities for flat sheet membranes will be similar to those described above for hollow fibers. These membranes may be used as filters or layered or spiral formation in a cartridge.

The examples which follow are given for illustrative purposes and are not meant to limit the invention described herein. The following abbreviations have been used throughout in describing the invention.

DMF—dimethylformamide
ft—foot (feet)

Hg—mercury
hr—hour(s)
ID—inner diameter
IgG—immunoglobulin G
IPA—isopropyl alcohol
L—liter(s)
$m^2$—square meters
min—minute
ml—milliliter(s)
mm—millimeter
N-MP—N-methylpyrrolidone
PS—polysulfone
psi—pounds per square inch
%—percent
THF—tetrahydrofuran
μm—micrometer(s)
vol—volume
wt—weight

EXAMPLE I

Hollow fiber membranes were prepared as indicated in Table I. These membranes demonstrate the claimed invention in a variety of embodiments. The proportions of polymer (polysulfone), solvent (N-MP) and pore-forming agents in the casting solution have been varied. A number of different pore-forming agents were used. The outer and center quench solutions (N-MP, IPA and water) were varied as to concentration. The spinning conditions were varied as shown in Table I. Characteristics of representative membranes from Table I are shown in Table II.

The spinning procedures followed the wet spinning process described above. The overall process is depicted in FIG. 1. A tube-in-tube spinnerette was made by inserting a glass capillary tube into a heavy wall precision bore glass tube and positioned concentrically with a short glass sleeve which also served to separate the casting solution and center quench solution. The diameters of the glass capillary and precision bore glass tube were selected on the basis of the outside diameter required for the hollow fiber. For example, the spinnerette used to prepare membrane Lot Nos. 3326-33-1, 3326-40-1 and 3330-30-1 of Table I had the following dimensions:

Precision Bore Glass Tube ID: 420 μm
Glass Capillary OD 169: μm
Glass Capillary ID 97: μm
Glass Capillary Recess: 635 μm Prior to casting solution delivery, the center quench solution was flowed through the spinnerette while the spinnerette was elevated above the precipitation tank to keep the glass capillary open by an uninterrupted positive pressure. The center quench solution was filtered by a 5.0 μm membrane. When the casting solution was extruded through the spinnerette, the spinnerette was lowered into the precipitation (outer quench) bath immediately. The casting solution left the spinnerette in a downward direction and the fiber was brought through two 90° turns by guiding rollers to an upward direction. The fiber was then carried out of the precipitation tank to the take-up roll. The take-up roll was partially submerged in a water bath with a water spray on the top of the roll.

When a sufficient amount of fiber was collected on the take-up roll, the fiber bundle was removed and was cut into lengths and both ends tied with yarn. The bundles were put into a water bath overnight for further water washing. After water washing, the bundles were soaked overnight in a 10-30% (vol/vol) glycerin bath. Finally, the bundles were dried in ambient temperatures without any tension for one to two days. The fibers were potted into cartridges and tested for water permeability, flux, transmembrane pressure (TMP) and protein rejection. Data for representative membranes are shown in Table II. For example, fibers in Lot. No. 3341-41-0 completely rejected *E. coli* cells (large particle size), while exhibiting only 16% rejection of IgG protein (smaller particle size).

TABLE I

| Membrane (Lot No.) | CASTING SOLUTION Component | Wt % | OUTER QUENCH Component | Wt % | CENTER QUENCH Component | Wt % | Spinning Conditions[1] |
|---|---|---|---|---|---|---|---|
| 3326-6-2 | Udel 3500[2] PS | 14.0 | N-MP | 46.3 | N-MP | 20.0 | CSP - 11.8 psi |
|  | N-MP | 80.0 | IPA | 40.8 | IPA | 70.0 | CQFP - 11.0 psi |
|  | PVP C-15 | 6.0 | Water | 12.9 | Water | 10.0 | DR - 8.5 ft/min |
| 3326-14-1 | Udel 3500 PS | 12.0 | N-MP | 42.0 | N-MP | 20.0 | CSP - 9.5 psi |
|  | N-MP | 74.0 | IPA | 14.0 | IPA | 10.0 | CQFP - 15.0 psi |
|  | Cyclododecanone | 8.0 | Water | 44.0 | Water | 70.0 | DR - 7.5 ft/min |
|  | BIOPOL XP-5[3] | 6.0 |  |  |  |  |  |
| 3326-14-2 | Udel 3500 PS | 12.0 | N-MP | 60.0 | N-MP | 60.0 | CSP - 9.5 psi |
|  | N-MP | 74.0 | IPA | 20.0 | IPA | 20.0 | CQFP - 15.0 psi |
|  | Cyclododecanone | 8.0 | Water | 20.0 | Water | 20.0 | DR - 7.5 ft/min |
|  | BIOPOL XP-5 | 6.0 |  |  |  |  |  |
| 3330-29-2 | Udel 3500 PS | 12.0 | N-MP | 60.0 | N-MP | 60.0 | CSP - 9.5 psi |
|  | N-MP | 74.0 | IPA | 20.0 | IPA | 20.0 | CQFP - 15.8 psi |
|  | Cyclododecanone | 8.0 | Water | 20.0 | Water | 20.0 | DR - 10.5 ft/min |
|  | BIOPOL XP-5 | 6.0 |  |  |  |  |  |
| 3341-41-0 | Udel 3500 PS | 12.0 | N-MP | 60.0 | N-MP | 60.0 | CSP - |
|  | N-MP | 69.0 | IPA | 20.0 | IPA | 20.0 | CQFP - |
|  | Cyclododecanone | 8.0 | Water | 20.0 | Water | 20.0 | DR - 5.0 ft/min |
|  | BIOPOL XP-5 | 11.0 |  |  |  |  |  |
| 3341-41-2 | Udel 3500[2] PS | 12.0 | N-MP | 60.0 | N-MP | 60.0 | CSP - 14.0 psi |
|  | N-MP | 69.0 | DMSO | 15.0 | DMSO | 15.0 | CQFP - 8.0 psi |
|  | Cyclododecanone | 8.0 | Water | 25.0 | Water | 25.0 | DR - 5.0 ft/min |
|  | BIOPOL XP-5[3] | 11.0 |  |  |  |  |  |
| 3330-10-2 | Udel 3500 PS | 15.0 | N-MP | 60.0 | N-MP | 30.0 | CSP - 13.5 psi |
|  | N-MP | 76.0 | IPA | 20.0 | IPA | 60.0 | CQFP - 15.0 psi |
|  | Isobutyl Alcohol | 9.0 | Water | 20.0 | Water | 10.0 | DR - 14.0 ft/min |
| 3310-29-1 | Udel 3500 PS | 18.0 | N-MP | 10.0 | N-MP | 10.0 | CSP - 16.0 psi |
|  | N-MP | 74.0 | IPA | 80.0 | IPA | 80.0 | CQFP - 20.0 psi |
|  | t-Butyl Alcohol | 8.0 | Water | 10.0 | Water | 10.0 | DR - 15.0 ft/min |
| 3310-25-1 | Udel 3500 PS | 16.0 | N-MP | 10.0 | N-MP | 10.0 | CSP - 12.5 psi |
|  | N-MP | 78.0 | IPA | 80.0 | IPA | 80.0 | CQFP - 5.0 psi |

TABLE I-continued

| Membrane (Lot No.) | CASTING SOLUTION Component | Wt % | OUTER QUENCH Component | Wt % | CENTER QUENCH Component | Wt % | Spinning Conditions[1] |
|---|---|---|---|---|---|---|---|
| | t-Butyl Alcohol | 6.0 | Water | 10.0 | Water | 10.0 | DR - 7.5 ft/min |
| 3326-19-1 | Udel 3500 PS | 16.0 | N-MP | 42.0 | N-MP | 20.0 | CSP - 11.0 psi |
| | N-MP | 75.0 | IPA | 44.0 | IPA | 10.0 | CQFP - 9.5 psi |
| | t-Butyl Alcohol | 9.0 | Water | 14.0 | Water | 70.0 | DR - 9.5 ft/min |
| 3326-31-1 | Udel 3500 PS | 15.0 | N-MP | 46.3 | N-MP | 20.0 | CSP - 5.0 psi |
| | N-MP | 76.0 | IPA | 40.8 | IPA | 70.0 | CQFP - 7.0 psi |
| | t-Butyl Alcohol | 9.0 | Water | 12.9 | Water | 10.0 | DR - 10 ft/min |
| 3326-33-1 | Udel 3500 PS | 15.0 | N-MP | 42.0 | N-MP | 42.0 | CSP - 8.5 psi |
| | N-MP | 74.0 | IPA | 44.0 | IPA | 44.0 | CQFP - 10.0 psi |
| | t-Butyl Alcohol | 11.0 | Water | 14.0 | Water | 14.0 | DR - 11.5 ft/min |
| 3326-40-1 | Udel 3500 PS | 15.0 | N-MP | 60.0 | N-MP | 30.0 | CSP - 10.0 psi |
| | N-MP | 72.0 | IPA | 20.0 | IPA | 60.0 | CQFP - 7.0 psi |
| | t-Butyl Alcohol | 11.0 | Water | 20.0 | Water | 100 | DR - 9.0 ft/min |
| 3330-30-1 | Udel 3500 PS | 13.0 | N-MP | 60.0 | N-MP | 30.0 | CSP - 7.8 psi |
| | N-MP | 62.0 | IPA | 20.0 | IPA | 60.0 | CQFP - 17.0 psi |
| | t-Butyl Alcohol | 25.0 | Water | 20.0 | Water | 10.0 | DR - 11.5 ft/min |
| 3336-20-1 | Udel 3500 PS | 13.0 | N-MP | 60.0 | N-MP | 30.0 | CSP - 5.8 psi |
| | N-MP | 62.0 | IPA | 20.0 | IPA | 60.0 | CQFP - 11.0 psi |
| | t-Butyl Alcohol | 25.0 | Water | 20.0 | Water | 10.0 | DR - 9.5 ft/min |
| 3377-18-2 | Udel 3500 PS | 13.0 | N-MP | 60.0 | N-MP | 60.0 | CSP - 16.5 psi |
| | N-MP | 62.0 | IPA | 20.0 | IPA | 20.0 | CQFP - 18.0 psi |
| | t-Butyl Alcohol | 25.0 | Water | 20.0 | Water | 20.0 | DR - 12.5 ft/min |
| 3377-18-1 | Udel 3500 PS | 13.0 | N-MP | 60.0 | N-MP | 60.0 | CSP - 8.0 psi |
| | N-MP | 62.0 | IPA | 20.0 | IPA | 20.0 | CQFP - 2.0 psi |
| | t-Butyl Alcohol | 25.0 | Water | 20.0 | Water | 20.0 | DR - 17.5 ft/min |

[1]CSP = Casting Solution Pressure
CQFP = Center Quench Fluid Pressure
DR = Drawing Rate
[2]Trademark of Amoco Performance Products Inc.
[3]Trademark of Grace Specialty Chemicals Co., W. R. Grace & Co.-Conn.

TABLE II

| Membrane (Lot No.) | ID ($\mu$m) | Wall ($\mu$m) | $H_2O$ Permeability (ml/min/m$^2$/mmHg) | Protein Flux (L/hr/m$^2$) | Protein Rejection |
|---|---|---|---|---|---|
| 3326-14-2 | 344.0 | 23.5 | 165.0 | 19.5[1] | 7.80%[5] |
| 3326-31-1 | 282.0 | 23.3 | 62.0 | 20.7[1] | 22.60%[5] |
| 3326-6-2 | 311.0 | 26.0 | 37.3 | 12.4[1] | 29.30%[5] |
| 3330-30-1 | 324.0 | 28.0 | 180.0 | 9.7[2] | 16.00%[6] |
| 3330-29-2 | 324.0 | 28.0 | 190.0 | 7.1[2] | 12.80%[6] |
| 3377-18-2 | 212.0 | 50.0 | 150.0 | 138.0[3] | 0.45%[7] |
| 3377-18-1 | 957.0 | 64.0 | 111.0 | 315.0[3] | 1.58%[7] |
| 3341-41-0 | 790.0 | 90.0 | 209.0 | 36.0[3] | 16.00%[7] |
| 3341-41-0 | 790.0 | 90.0 | 209.0 | — | 100.00%[8] |

[1]Flux measured as to bovine plasma at 2.0 psi.
[2]Flux measured as to human plasma at 2.0 psi.
[3]Flux measured as to IgG at 2.0 psi.
[4]TMP = transmembrane pressure.
[5]Albumin rejection.
[6]Plasma protein rejection.
[7]IgG rejection.
[8]*E. coli* cell rejection.

EXAMPLE II

A flat sheet membrane (Lot No. 3377-7-3) was prepared according to the following:

| Casting Solution: | 8% Udel ® 1700 PS |
| --- | --- |
| | 17% t-Butanol |
| | 11% Methanol |
| | 64% N-MP |
| Quench Solution: | 60% N-MP |
| | 20% Isopropyl Alcohol |
| | 20% Water |

The membrane characteristics are shown in Table III. The membrane was prepared by casting a 10.0 mil (wet thickness) film of the casting solution onto a glass plate in a bath containing the quench solution, using a casting knife at room temperature. The glass plate with the film was kept in the bath for 10-15 minutes. The membrane was removed from the glass plate and was soaked in a deionized water bath for two hours. After water washing, the membrane then was soaked overnight in a 10-30% (vol/vol) glycerin bath. Finally, the flat sheet membrane was dried at ambient temperatures.

EXAMPLE III

A flat sheet membrane (Lot No. 3377-10-3) was prepared according to the following:

| Casting Solution: | 9% Udel ® 1700 PS |
| --- | --- |
| | 10% t-Butanol |
| | 15% Methanol |
| | 66% N-MP |
| Quench Solution: | 60% N-MP |
| | 20% Isopropyl Alcohol |
| | 20% Water |

The membrane characteristics are shown in Table III. The membrane was prepared by casting a 10.0 mil (wet thickness) film of the casting solution onto a glass plate in a bath containing the quench solution, using a casting knife at room temperature. The glass plate with the film was kept in the bath for 10-15 minutes. The membrane was removed from the glass plate and was soaked in a deionized water bath for two hours. After water washing, the membrane then was soaked overnight in a 10-30% (vol/vol) glycerin bath. Finally, the flat sheet membrane was dried at ambient temperatures.

TABLE III

| Membrane | Membrane Thickness | Methanol Flow Rate[1] | Mean Bubble Point | Mean Pore Size |
|---|---|---|---|---|
| 3377-7-3 (Ex. II) | 3.7 mil | 27.4 | 40.0 psi | 0.10 $\mu$m |
| 3377-10-3 (Ex. III) | 2.5 mil | 28.5 | 20.5 psi | 0.22 $\mu$m |

[1]ml/min/cm$^2$ at 10 psi.

What is claimed is:

1. An ambient temperature process for forming an isotropic microporous polysulfone hollow fiber membrane, comprising:
   (a) preparing, in a solvent for polysulfone, a casting solution comprising about 8.0 to about 35.0 wt % of a polysulfone polymer, up to about 20.0 wt % of a second polymeric component prepolymer, and a pore-forming component,
   (b) preparing an outer precipitation solution comprising about 10.0 to 70.0 wt % solvent for polysulfone, about 5.0 to 40.0 wt % non-solvent for polysulfone and about 10.0 to 80.0 wt % swelling agent,
   (c) preparing a center precipitation solution comprising about 10.0 to 70.0 wt % solvent for polysulfone, about 5.0 to 40.0 wt % non-solvent for polysulfone and about 10.0 to 80.0 wt % swelling agent, the compositions of said outer precipitation solution and said center precipitation solution being adjusted to control the phase inversion rate such that an isotropic membrane is produced,
   (d) providing a precipitation bath containing said outer precipitation solution and having a hollow fiber-forming spinnerette partially immersed therein,
   (e) extruding said casting solution and said center precipitation solution through said spinnerette directly into said precipitation bath to form an extruded hollow fiber membrane,
   (f) drawing said extruded hollow fiber membrane through said precipitation bath, and
   (g) drying said extruded hollow fiber membrane.

2. The process of claim 1 in which the extruded hollow fiber membrane is washed in a water bath following step (f).

3. The process of claim 1 in which said extruded hollow fiber membrane is treated with a humectant or surfactant.

4. The process of claim 1 in which said extruded hollow fiber membrane is drawn through said precipitation bath at a rate between about 3.0 and about 30.0 feet per minute.

5. The process of claim 1 in which said casting solution comprises about 9.0 to about 18.0 wt % polysulfone.

6. The process of claim 1 in which said second polymeric component is polyethylene glycol, polyvinyl pyrrolidone or a polyurethane prepolymer.

7. The process of claim 1 in which said solvent for polysulfone is N-methyl-pyrrolidone, dimethylformamide, N-N-dimethylacetamide, cyclohexanone, chloroform or 4-butyrolactone.

8. The process of claim 1 in which said pore-forming component is selected from the group consisting of alkanols, polyols, polyglycols, cycloketones, polyvinyl pyrrolidone and water.

9. The process of claim 8 in which said pore-forming component is methanol, t-butanol, acetone, cyclododecanone, 4-hydroxybutyric acid or polyethylene glycol.

10. The process of claim 1 in which said non-solvent for polysulfone is water, methanol, ethanol, propanol, butanol, ethylene glycol, acetone or methyl ethyl ketone.

11. The process of claim 1 in which said swelling agent is isopropyl-alcohol, triethylene glycol, nitrobenzene, tetrahydrofuran, dioxane, dimethyl carbonate, dimethyl sulfone, diethyl phosphate or diemthyl sulfoxide.

12. The process of claim 1 in which said solvent is N-methyl-pyrrolidone.

13. The process of claim 1 in which said second polymeric component prepolymer is a polyurethane prepolymer, said pore-forming agent is cyclododecanone, said non-solvent is water and said swelling agent is isopropyl alcohol.

14. The process of claim 1 in which said precipitation solutions comprise N-methyl-pyrrolidone, water and isopropyl alcohol.

15. An ambient temperature process for forming an isotropic microporous polysulfone flat sheet membrane, comprising:
   (a) preparing, in a solvent for polysulfone, a casting solution comprising about 8.0 to about 35.0 wt % of a polysulfone polymer, up to about 20.0 wt % of a second polymeric component prepolymer, and a pore-forming component,
   (b) preparing a percipitation bath comprising about 10.0 to 70.0 wt % solvent for polysulfone, about 5.0 to 40.0 wt % non-solvent for polysulfone and about 10.0 to 80.0 wt % swelling agent,
   (c) casting said casting solution onto a rigid nonporous support directly in said precipitation bath to form a flat sheet membrane,
   (d) removing said flat sheet membrane from said rigid support, and
   (e) drying said flat sheet membrane.

16. The process of claim 15 which further comprises water washing said flat sheet membrane following step (d).

17. The process of claim 15 in which said flat sheet membrane is treated with a humectant or surfactant.

18. The process of claim 15 in which said solvent is N-methyl-pyrrolidone.

19. The process of claim 15 in which said second polymeric component prepolymer is a polyurethane prepolymer.

20. The process of claim 15 in which said rigid support of step (c) is covered with a reinforcement material which becomes an integral part of the flat sheet membrane.

* * * * *